(12) United States Patent
Paik et al.

(10) Patent No.: US 12,167,158 B2
(45) Date of Patent: Dec. 10, 2024

(54) ANALOG-TO-DIGITAL CONVERTING CIRCUIT FOR DECREASING DECISION DELAY AND OPERATION METHOD THEREOF

(71) Applicant: Samsung Electronics Co., Ltd., Suwon-si (KR)

(72) Inventors: Daehwa Paik, Suwon-si (KR); Cyuyeol Rhee, Suwon-si (KR); Kyungil Kim, Suwon-si (KR); Jaehong Kim, Suwon-si (KR); Jinwoo Kim, Suwon-si (KR); Seunghyun Lim, Suwon-si (KR); Sanghyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/062,853

(22) Filed: Dec. 7, 2022

(65) Prior Publication Data

US 2023/0345152 A1     Oct. 26, 2023

(30) Foreign Application Priority Data

Apr. 20, 2022 (KR) .................. 10-2022-0048993
Jun. 27, 2022 (KR) .................. 10-2022-0078392

(51) Int. Cl.
*H04N 25/78*     (2023.01)
*H04N 25/709*     (2023.01)

(52) U.S. Cl.
CPC .......... *H04N 25/78* (2023.01); *H04N 25/709* (2023.01)

(58) Field of Classification Search
CPC .......................... H04N 25/78; H04N 25/709
See application file for complete search history.

(56) References Cited

U.S. PATENT DOCUMENTS

| | | | |
|---|---|---|---|
| 7,875,842 B2 | 1/2011 | Kawaguchi et al. | |
| 8,766,843 B2 | 7/2014 | Ueno | |
| 10,079,990 B2 | 9/2018 | Ebihara et al. | |
| 10,194,111 B2* | 1/2019 | Inada | H04N 25/75 |
| 10,523,889 B2 | 12/2019 | Inada | |
| 10,616,518 B2 | 4/2020 | Jung et al. | |
| 11,184,571 B2 | 11/2021 | Otaka | |
| 11,206,039 B1* | 12/2021 | Ebihara | H03M 1/56 |

(Continued)

FOREIGN PATENT DOCUMENTS

KR    10-2019-0042389 A    4/2019

*Primary Examiner* — Shahbaz Nazrul
(74) *Attorney, Agent, or Firm* — Harness, Dickey & Pierce, P.L.C.

(57) ABSTRACT

An analog-to-digital converting circuit includes a first amplifier configured to output a first output signal by comparing a pixel signal output from a pixel array with a ramp signal, and a second amplifier configured to generate a second output signal based on the first output signal. The second amplifier includes a first transistor configured to provide a power supply voltage to a first output node in response to the first output signal, a second transistor connected with a capacitor through a bias node, wherein the second transistor is configured to turn on in response to an auto-zero signal, a current source connected with the first transistor through the first output node, the current source configured to generate a power current based on a voltage level of the bias node, and a third transistor connected with the current source.

19 Claims, 10 Drawing Sheets

(56) References Cited

U.S. PATENT DOCUMENTS

| | | | |
|---|---|---|---|
| 2009/0128676 A1* | 5/2009 | Tanaka | H04N 25/709 |
| | | | 348/340 |
| 2013/0215302 A1* | 8/2013 | Ueno | H03M 1/12 |
| | | | 348/300 |
| 2018/0191977 A1* | 7/2018 | Jung | H04N 25/70 |
| 2019/0116331 A1* | 4/2019 | Jung | H04N 25/77 |
| 2020/0244908 A1 | 7/2020 | Matsumoto et al. | |
| 2021/0368125 A1 | 11/2021 | Niwa et al. | |
| 2022/0353452 A1* | 11/2022 | Jun | H03M 1/56 |

* cited by examiner

ANALOG-TO-DIGITAL CONVERTING CIRCUIT FOR DECREASING DECISION DELAY AND OPERATION METHOD THEREOF

CROSS-REFERENCE TO RELATED APPLICATIONS

This application claims priority under 35 U.S.C. § 119 to Korean Patent Application No. 10-2022-0048993 filed on Apr. 20, 2022, and Korean Patent Application No. 10-2022-0078392 filed on Jun. 27, 2022, in the Korean Intellectual Property Office, the disclosures of each of which are incorporated by reference herein in their entireties.

FIELD

Some example embodiments of the inventive concepts described herein relate to an analog-to-digital converter, including an analog-to-digital converting circuit for decreasing decision delay and/or an operation method thereof.

BACKGROUND

An image sensor includes a charge coupled device (CCD) image sensor, a complementary metal-oxide semiconductor (CMOS) image sensor (CIS), etc. The CMOS image sensor includes pixels composed of CMOS transistors and converts light energy into an electrical signal by using a photoelectric conversion element (or device) included in each pixel. The CMOS image sensor obtains information about a captured/photographed image by using the electrical signal generated by each pixel.

An analog-to-digital converter (ADC) receives an analog input voltage generated by the pixel and converts the received analog input voltage to a digital signal. The converted digital signal may be provided to other devices. The ADC may be used in various signal processing devices. As the performance of signal processing devices is improved, an improved resolution for an analog signal is required. As such, there is used an ADC capable of processing many signals within the same time or providing an improved resolution for each signal. However, an increase in a frame rate of the image sensor causes an increase in an operating speed of the ADC.

SUMMARY

Some example embodiments of the inventive concepts provide an analog-to-digital converting circuit for decreasing decision delay and an operation method thereof.

According to an example embodiment, an analog-to-digital converting circuit includes a first amplifier configured to output a first output signal by comparing a pixel signal output from a pixel array with a ramp signal, and a second amplifier configured to generate a second output signal based on the first output signal. The second amplifier includes a first transistor configured to provide a power supply voltage to a first output node in response to the first output signal, the second output signal output from the first output node, a second transistor connected with a capacitor through a bias node, wherein the second transistor is configured to turn on in response to an auto-zero signal, a current source connected with the first transistor through the first output node, the current source connected with the capacitor and the second transistor through the bias node, and the current source configured to generate a power current based on a voltage level of the bias node, which is maintained by the capacitor, and a third transistor connected with the current source.

According to an example embodiment, a circuit configured to generate an output signal includes a first transistor configured to provide a power supply voltage to a first output node, the first output node configured to output an output signal, a second transistor connected with a capacitor through a bias node, wherein the second transistor is configured to turn on in response to an auto-zero signal, a current source connected with the first transistor through the first output node, the current source connected with the capacitor and the second transistor through the bias node, and the current source configured to generate a power current based on a voltage level of the bias node, which is maintained by the capacitor, and a third transistor connected with the current source.

According to an example embodiment, an operation method of an analog-to-digital converting circuit that includes a first amplifier and a second amplifier, includes equalizing voltage levels of input nodes and output nodes of the first and second amplifiers in response to an auto-zero signal in an auto-zero period, adjusting a voltage level of a bias node of the second amplifier in response to an option signal in the auto-zero period, comparing, at the first amplifier, a pixel signal output from a pixel array with a ramp signal, to generate a first output signal in an operation period, and generating, at the second amplifier, a second output signal based on the first output signal in the operation period.

According to an example embodiment, an image sensor includes a pixel array configured to convert a light into an electrical signal to generate a pixel signal, and an analog-to-digital converting circuit configured to convert the pixel signal into a digital signal, wherein the analog-to-digital converting circuit includes a first amplifier configured to compare the pixel signal with a ramp signal to output a first output signal, and a second amplifier configured to generate a second output signal based on the first output signal. The second amplifier includes a first transistor configured to provide a power supply voltage to a first output node in response to the first output signal, the second output signal output from the first output node, a second transistor connected with a capacitor through a bias node, wherein the second transistor is configured to turn on in response to an auto-zero signal, a current source connected with the first transistor through the first output node, the current source connected with the capacitor and the second transistor through the bias node, and the current source configured to generate a power current based on a voltage level of the bias node, which is maintained by the capacitor, and a third transistor connected with the current source.

BRIEF DESCRIPTION OF THE FIGURES

The above and other objects and features of the inventive concepts will become apparent by describing in detail example embodiments thereof with reference to the accompanying drawings.

DETAILED DESCRIPTION

Below, some example embodiments of the inventive concepts will be described in detail and clearly to such an extent that one skilled in the art easily carries out the inventive concepts.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
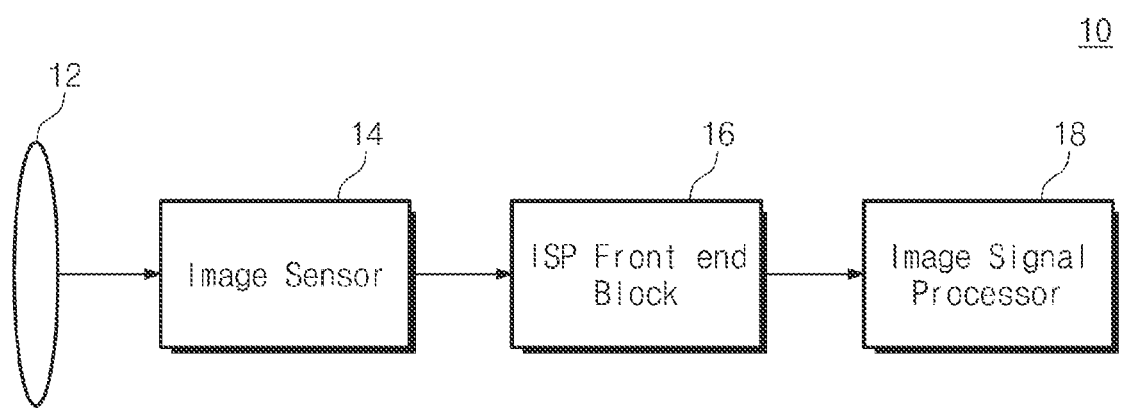
FIG. 1 illustrates an example of a configuration of an image processing block according to an example embodiment of the inventive concepts.

FIG. 1 illustrates an example of a configuration of an image processing block 10 according to an example embodiment of the inventive concepts. The image processing block 10 may be implemented as a part of various electronic devices such as a smartphone, a digital camera, a laptop computer, and a desktop computer. The image processing block 10 may include a lens 12, an image sensor 14, an image signal processor (ISP) front end block 16, and an image signal processor 18.

A light may be reflected by an object, a scenery, etc. targeted for photographing, and the lens 12 may receive the reflected light. The image sensor 14 may generate an electrical signal based on the light received through the lens 12. For example, the image sensor 14 may be implemented with a complementary metal-oxide semiconductor (CMOS) image sensor or the like. For example, the image sensor 14 may be a multi-pixel image sensor having a dual pixel structure or a tetra cell structure (e.g., a pixel-merging structure that bins four pixel signals into one).

The image sensor 14 may include a pixel array. Pixels of the pixel array may convert a light into electrical signals to generate pixel values. In addition, the image sensor 14 may include an analog-to-digital converting (ADC) circuit for performing correlated double sampling (CDS) on the pixel values. A configuration of the image sensor 14 will be described in detail with reference to FIG. 2.

The ISP front end block 16 may perform pre-processing on an electrical signal output from the image sensor 14 so as to be appropriate for processing of the image signal processor 18.

The image signal processor 18 may generate image data associated with the photographed object and scenery by appropriately processing the electrical signal processed by the ISP front end block 16. To this end, the image signal processor 18 may perform various processing operations such as color correction, auto white balance, gamma correction, color saturation correction, formatting, bad pixel correction, and hue correction, but example embodiments are not limited thereto.

One lens 12 and one image sensor 14 are illustrated in FIG. 1. However, in another example embodiment, the image processing block 10 may include a plurality of lenses, a plurality of image sensors, and a plurality of ISP front end blocks. In some example embodiments, the plurality of lenses may have different fields of view. Also, the plurality of image sensors may have different functions, different performances, and/or different characteristics, and may respectively include pixel arrays of different configurations.

Figure 2:
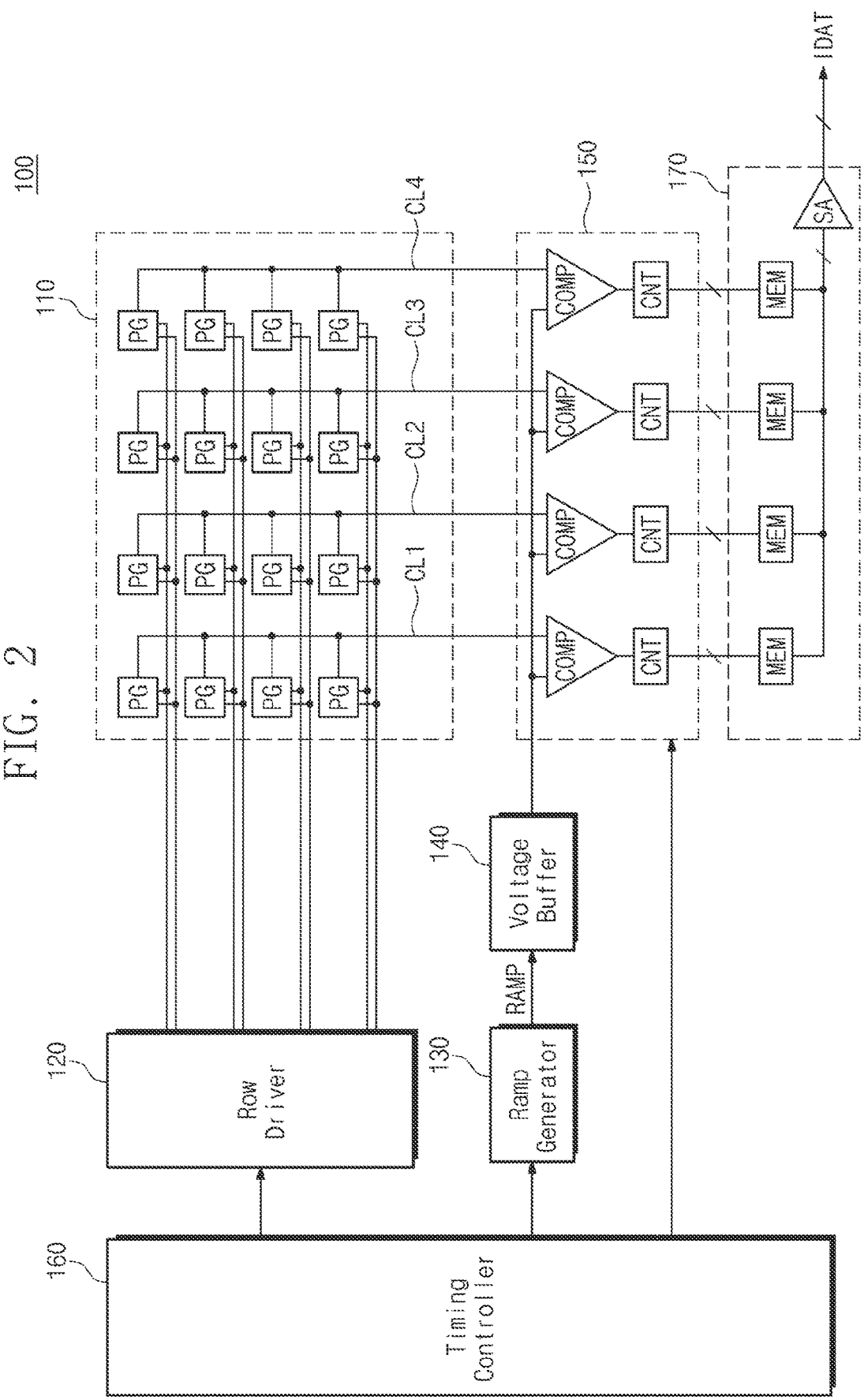
FIG. 2 illustrates an example of a configuration of an image sensor of FIG. 1.

FIG. 2 illustrates an example of a configuration of the image sensor 14 of FIG. 1. An image sensor 100 may include a pixel array 110, a row driver 120, a ramp signal generator 130, a voltage buffer 140, an ADC circuit 150, a timing controller 160, and a buffer 170.

The pixel array 110 may include a plurality of pixels arranged in the form of a matrix, that is, arranged along rows and columns. Each of the plurality of pixels may include a photoelectric conversion element (or device). For example, the photoelectric conversion element may include a photo diode, a photo transistor, a photo gate, a pinned photo diode, or the like.

The pixel array 110 may include a plurality of pixel groups PG. Each pixel group PG may include two or more pixels, that is, a plurality of pixels. A plurality of pixels constituting a pixel group PG may share one floating diffusion region or a plurality of floating diffusion regions. An example in which the pixel array 110 includes the pixel groups PG arranged in the form of a matrix with four rows and four columns (e.g., includes 4×4 pixel groups PG) is illustrated in FIG. 2. However, the inventive concepts are not limited thereto.

The pixel group PG may include pixels of the same or substantially the same color. For example, the pixel group PG may include a red pixel to convert a light of a red spectrum into an electrical signal, a green pixel to convert a light of a green spectrum into an electrical signal, or a blue pixel to convert a light of a blue spectrum into an electrical signal. For example, the pixels constituting the pixel array 110 may be arranged in the form of a tetra-Bayer pattern.

The pixels of the pixel array 110 may output pixel signals through column lines CL1, CL2, CL3 and CL4, depending on the intensity or the amount of light received from the outside. For example, the pixel signal may be an analog signal corresponding to the intensity or the amount of light received from the outside. The pixel signals may pass through voltage buffers (e.g., source followers) and may then be provided to the ADC circuit 150 through the column lines CL1 to CL4.

The row driver 120 may select and drive a row of the pixel array 110. The row driver 120 may decode an address and/or a control signal generated by the timing controller 160 and may generate control signals for selecting and driving a row of the pixel array 110. For example, the control signals may include a signal for selecting a pixel, a signal for resetting a floating diffusion region, etc.

The ramp signal generator 130 may generate a ramp signal RAMP under control of the timing controller 160. For example, the ramp signal generator 130 may operate in response to a control signal such as a ramp enable signal. When the ramp enable signal is activated, the ramp signal generator 130 may generate the ramp signal RAMP depending on preset values (e.g., a start level, an end level, and a slope). In other words, the ramp signal RAMP may be a signal that increases or decreases along a preset slope during a specific time. The ramp signal RAMP may be provided to the ADC circuit 150 through the voltage buffer 140.

The ADC circuit 150 may receive pixel signals from a plurality of pixels through the column lines CL1 to CL4, and may receive the ramp signal RAMP from the ramp signal generator 130 through the voltage buffer 140. The ADC circuit 150 may operate based on a correlated double sampling (CDS) technique for obtaining a reset signal and an image signal from the received pixel signal and extracting a difference between the reset signal and the image signal as an effective signal component. The ADC circuit 150 may include a plurality of comparators COMP and a plurality of counters CNT.

In detail, each of the comparators COMP may compare the reset signal of the pixel signal and the ramp signal RAMP, may compare the image signal of the pixel signal and the ramp signal RAMP, and may perform correlated double sampling (CDS) on comparison results. Each of the counters CNT may count pulses of the signal experiencing the correlated double sampling and may output a counting result as a digital signal. An example in which the ADC circuit 150 includes four comparators COMP and four counters CNT is illustrated in FIG. 2, but the example embodiments are not limited thereto.

The timing controller 160 may generate a control signal and/or a clock for controlling an operation and/or a timing of each of the row driver 120, the ramp signal generator 130, and the ADC circuit 150.

The buffer 170 may include memories MEMs and a sense amplifier SA. The memories MEM may store digital signals output from the corresponding counters CNT of the ADC circuit 150. The sense amplifiers SA may sense and amplify the digital signals stored in the memories MEMs. The sense amplifier SA may output the amplified digital signals as image data IDAT, and the image data IDAT may be provided to the ISP front end block 16 of FIG. 1.

Figure 3:
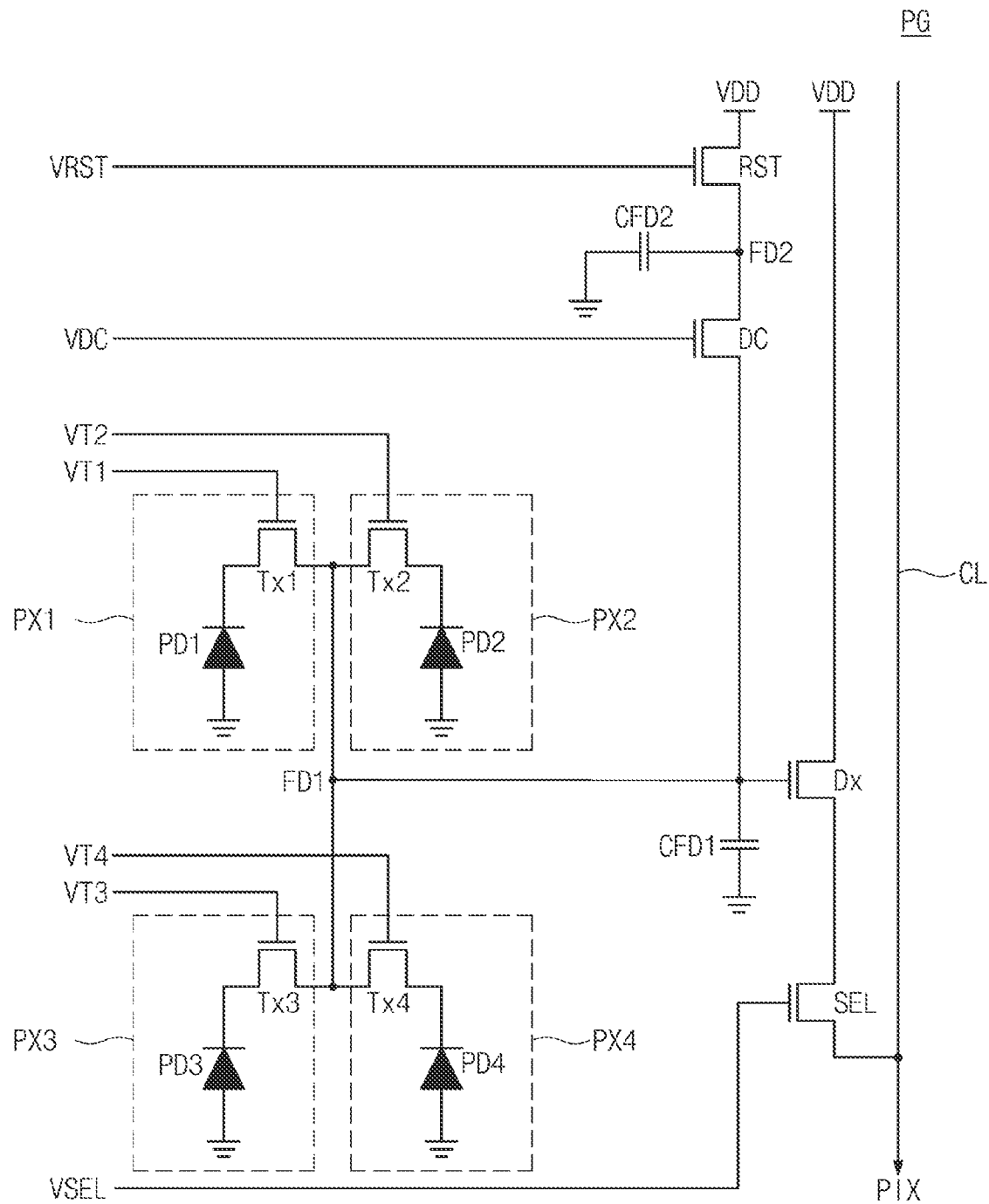
FIG. 3 is a circuit diagram illustrating an example of one of pixel groups in a pixel array of FIG. 2.

FIG. 3 is a circuit diagram illustrating an example embodiment of one of the pixel groups PG of the pixel array 110 of FIG. 2. For example, the pixel group PG may include pixels PX1 to PX4, photoelectric conversion elements PD1 to PD4, transfer transistors Tx1, Tx2, Tx3 and Tx4, a reset transistor RST, a dual conversion transistor DC, a drive transistor Dx, and a select transistor SEL. An example in which the pixel group PG has a tetra cell structure in which four pixels PX1 to PX4 respectively include photoelectric conversion elements PD1 to PD4 is illustrated in FIG. 3, but the example embodiments are not limited thereto. For example, the pixel group PG may be implemented to have various different structures.

The first pixel PX1 may include the first photoelectric conversion element PD1 and the first transfer transistor Tx1, and each of the remaining pixels PX2, PX3, and PX4 may also include similar components/elements. The pixels PX1 to PX4 may share the reset transistor RST, the dual conversion transistor DC, the drive transistor Dx, and the select transistor SEL. Also, the pixels PX1 to PX4 may share a first floating diffusion region FD1.

The first floating diffusion region FD1 or a second floating diffusion region FD2 may accumulate (or integrate) charges corresponding to the amount of incident light. While the transfer transistors Tx1 to Tx4 are respectively turned on by transfer signals VT1, VT2, VT3 and VT4, the first floating diffusion region FD1 or the second floating diffusion region FD2 may accumulate (or integrate) charges supplied from the photoelectric conversion elements PD1 to PD4. Because the first floating diffusion region FD1 is connected with a gate terminal of the drive transistor Dx operating as a source follower amplifier, a voltage corresponding to the charges accumulated at the first floating diffusion region FD1 may be formed. For example, a capacitance of the first floating diffusion region FD1 is depicted as a first capacitance CFD1.

The dual conversion transistor DC may be driven by a dual conversion signal VDC. When the dual conversion transistor DC is turned off, the capacitance of the first floating diffusion region FD1 may correspond to the first capacitance CFD1. In a general environment, because the first floating diffusion region FD1 is not easily saturated, there is no need or desire to increase the capacitance (e.g., CFD1) of the first floating diffusion region FD1. In some example embodiments, the dual conversion transistor DC may be turned off.

However, in a high-luminance environment, the first floating diffusion region FD1 may be easily saturated. To prevent or inhibit the saturation, the dual conversion transistor DC may be turned on such that the first floating diffusion region FD1 and the second floating diffusion region FD2 are electrically connected. In some example embodiments, a capacitance of the floating diffusion regions FD1 and FD2 may be increased to a sum of the first capacitance CFD1 and a second capacitance CFD2.

The transfer transistors Tx1 to Tx4 may be respectively driven by the transfer signals VT1 to VT4, and may transfer charges generated (or integrated) by the photoelectric conversion elements PD1 to PD4 to the first floating diffusion region FD1 or the second floating diffusion region FD2. For example, first ends of the transfer transistors Tx1 to Tx4 may be respectively connected with the photoelectric conversion elements PD1 to PD4, and second ends thereof may be connected in common with the first floating diffusion region FD1.

The reset transistor RST may be driven by a reset signal VRST and may provide a power supply voltage VDD to the first floating diffusion region FD1 or the second floating diffusion region FD2. As such, the charges accumulated in the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify a voltage of the first floating diffusion region FD1 or the second floating diffusion region FD2 and may generate a pixel signal PIX corresponding to a result of the amplification. The select transistor SEL may be driven by a selection signal VSEL and may select pixels to be read in units of row. When the select transistor SEL is turned on, the pixel signal PIX may be output to the ADC circuit 150 of FIG. 2 through a column line CL.

Figure 4:
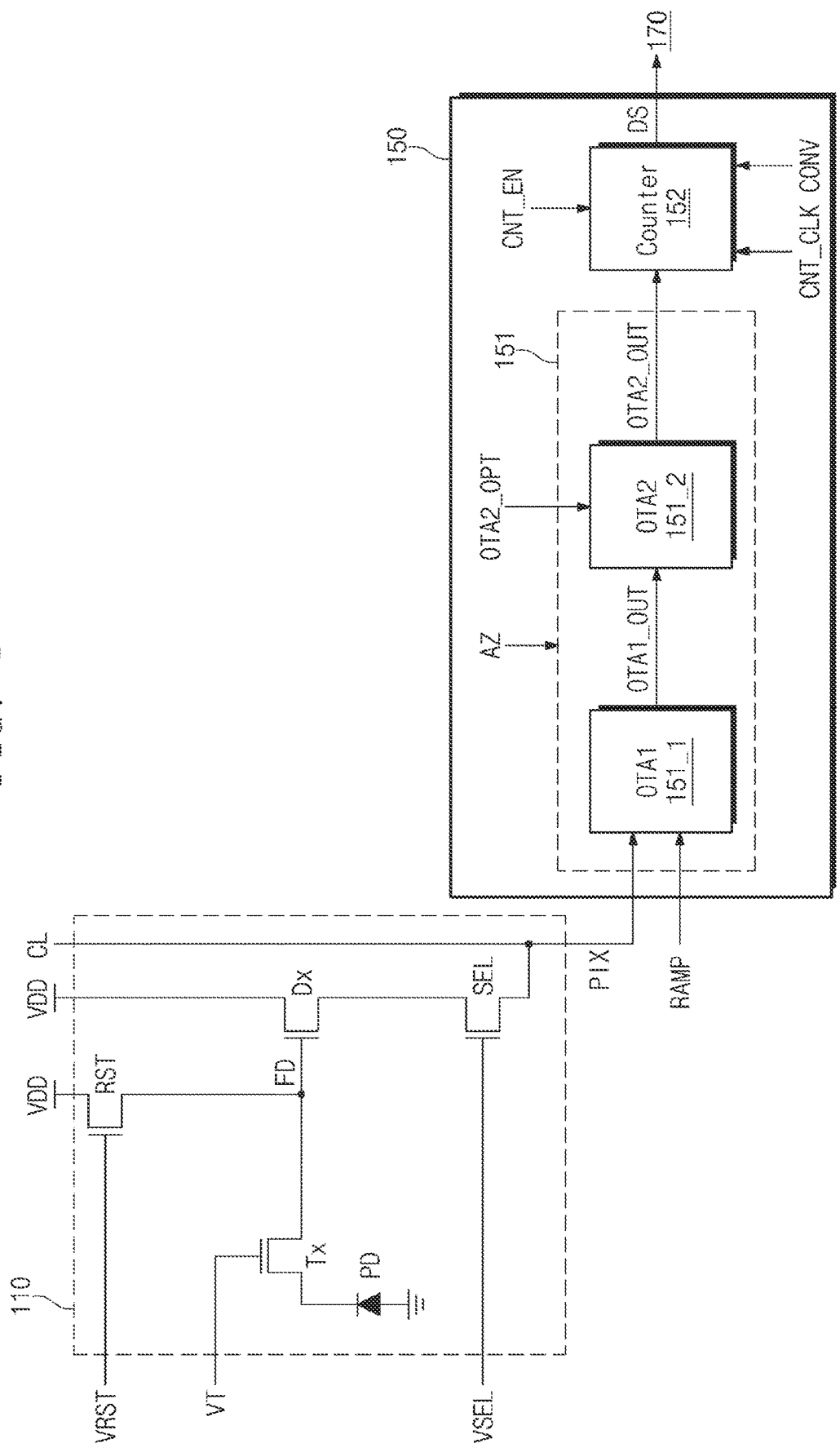
FIG. 4 illustrates an example of a configuration of an analog-to-digital converting circuit of FIG. 2.

FIG. 4 illustrates an example embodiment of a configuration of the analog-to-digital converting (ADC) circuit 150 of FIG. 2. The ADC circuit 150 may include a comparator 151 and a counter 152. The ADC circuit 150 may convert and output the pixel signal PIX being an analog signal output from the pixel array 110 into a digital signal DS. For the clearness of description and the brevity of drawing, an example in which the pixel array 110 includes only one pixel is illustrated in FIG. 4, and the configuration and function of the pixel array 110 are identical to those described with reference to FIG. 3.

In detail, as described with reference to FIG. 2, the comparator 151 may compare a reset signal of a pixel signal and the ramp signal RAMP, may compare an image signal of the pixel signal and the ramp signal RAMP, and may perform correlated double sampling (CDS) on comparison results, and the counter 152 may count pulses of a signal experiencing the correlated double sampling (CDS) and may output a counting result as a digital signal. FIG. 4 will be described with reference to FIGS. 2 and 3.

For example, the comparator 151 may have a two-stage structure including two amplifiers (e.g., a first amplifier 151_1 and a second amplifier 151_2), and each of the first amplifier 151_1 and the second amplifier 151_2 may be implemented as an operational transconductance amplifier (OTA). However, the example embodiments are not limited thereto. For example, the comparator 151 may have a structure including more amplifiers. Also, the ADC circuit 150 may include a plurality of comparators and a plurality of counters, but one comparator 151 and one counter 152 are illustrated in FIG. 4 for the clearness of description.

The first amplifier 151_1 may receive the pixel signal PIX from the pixel array 110 through the column line CL, and may receive the ramp signal RAMP from the ramp signal generator 130 through the voltage buffer 140. The first amplifier 151_1 may output a first output signal OTA1_OUT based on the received signals. For example, in a period where a level of the ramp signal RAMP is higher than a level of the pixel signal PIX, the first amplifier 151_1 may output the first output signal OTA1_OUT having a high level; in a period where the level of the ramp signal RAMP is lower than the level of the pixel signal PIX, the first amplifier 151_1 may output the first output signal OTA1_OUT having a low level. Also, the comparison operation of the first amplifier 151_1 described above may be performed both when the reset signal of the pixel signal PIX and the ramp signal RAMP are compared and when the image signal of the pixel signal PIX and the ramp signal RAMP are compared.

The second amplifier 151_2 may amplify the first output signal OTA1_OUT and may output a second output signal OTA2_OUT being a comparison signal. For example, the second output signal OTA2_OUT may be an inverted version of the first output signal OTA1_OUT. In other words, the second amplifier 151_2 may output the second output signal OTA2_OUT having the low level during the high level of the first output signal OTA1_OUT and may output the second output signal OTA2_OUT having the high level during the low level of the first output signal OTA1_OUT.

In the following description, that a voltage level of the first output signal OTA1_OUT or the second output signal OTA2_OUT transitions from the high level to the low level or from the low level to the high level as the comparator 151 performs the comparison operation may be referred to as "decision of the ADC circuit 150". In other words, "after the decision of the circuit 150 ends" may mean "after a voltage level of the first output signal OTA1_OUT or the second output signal OTA2_OUT changes from the high level to the low level or from the low level to the high level".

In an auto-zero period before the comparison operation is performed, the comparator 151 may be initialized in response to an auto-zero signal and may then again perform the comparison operation. For example, during the auto-zero period, input nodes and/or output nodes of the first amplifier 151_1 and the second amplifier 151_2 may be set to the same or substantially the same voltage level. In addition, the second amplifier 151_2 according to an example embodiment of the inventive concepts may be provided with an option signal OTA2_OPT in the auto-zero period, and a level of the output current corresponding to the second output signal OTA2_OUT may increase.

The counter 152 may operate under control of the timing controller 160, may count pulses of the second output signal OTA2_OUT, and may output a counting result as the digital signal DS. For example, the counter 152 may operate in response to control signals such as a counter enable signal CNT_EN, a counter clock signal CNT_CLK, and an inversion signal CONV for inverting an internal bit of the counter 152.

For example, the counter 152 may include an up/down counter, a bit-wise inversion counter, etc. An operation of the bit-wise inversion counter may be similar to an operation of the up/down counter. For example, the bit-wise inversion counter may perform a function of performing up-counting only and a function of converting all internal bits of a counter to obtain the 1's complement when a specific signal is input thereto. The bit-wise inversion counter may perform a reset count operation and may then invert a reset counting result so as to be converted into the 1's complement, that is, a negative value.

Figure 5:
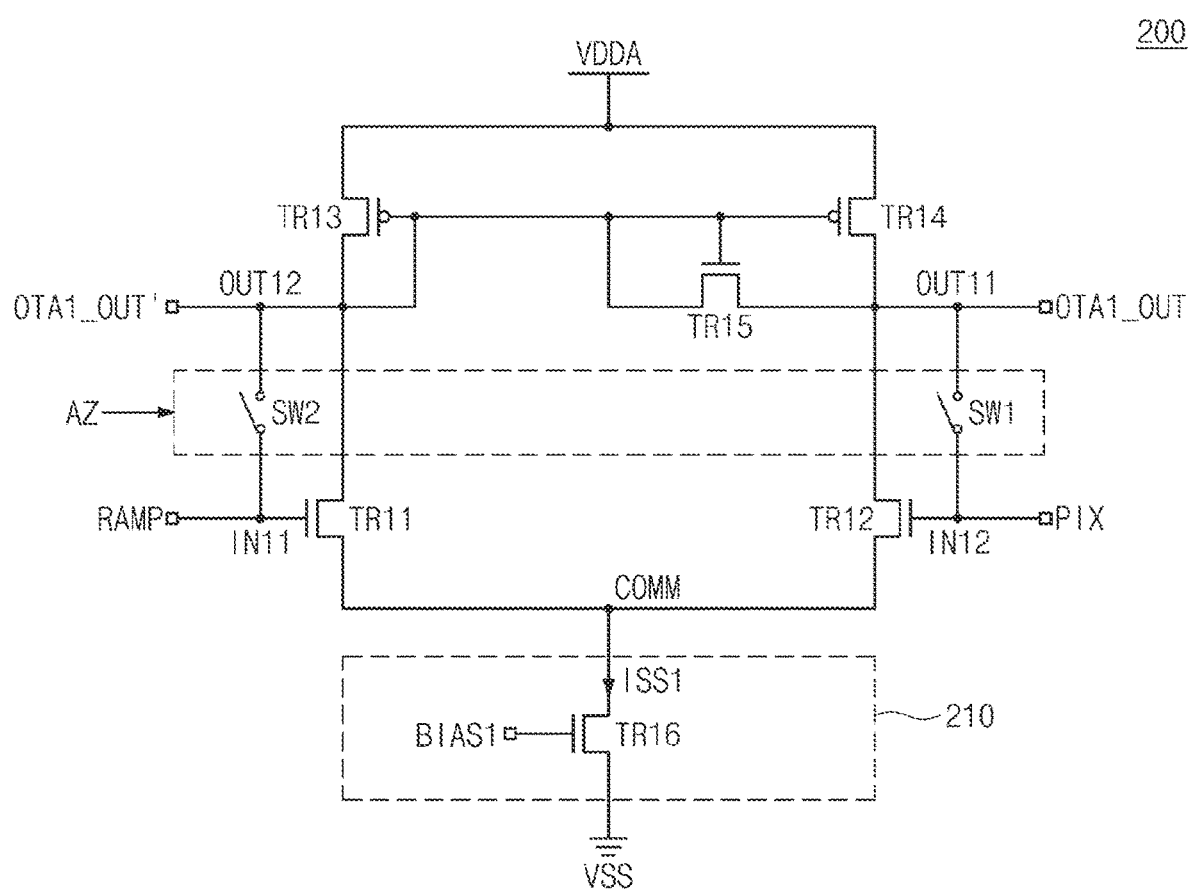
FIG. 5 is a circuit diagram illustrating an example of a first amplifier of FIG. 4.

FIG. 5 is a circuit diagram illustrating an example embodiment of the first amplifier 151_1 of FIG. 4. A first amplifier 200 may include a plurality of transistors TR11 to TR16, a plurality of switches SW1 and SW2, and a first current source 210. For example, the first transistor TR11, the second transistor TR12, the fifth transistor TR15, and the sixth transistor TR16 may be NMOS transistors, and the third transistor TR13 and the fourth transistor TR14 may be PMOS transistors. However, the example embodiments are not limited thereto. The first to sixth transistors TR11 to TR16 may be implemented with transistors whose types are different from those illustrated in FIG. 5.

Referring to FIG. 5, the ramp signal RAMP may be input to a gate terminal of the first transistor TR11, and the pixel signal PIX may be input to a gate terminal of the second transistor TR12. Source terminals of the first and second transistors TR11 and TR12 may be connected with the first current source 210 at a common node COMM. For example, the third and fourth transistors TR13 and TR14 may be connected in the form of a current mirror. A sum of currents flowing to the first and second transistors TR11 and TR12 may be equal or substantially equal to a first power current ISS1.

A gate terminal and a drain terminal of the third transistor TR13 and a drain terminal of the first transistor TR11 may be connected in common with a second output node OUT12, and a drain terminal of the fourth transistor TR14 and a drain terminal of the second transistor TR12 may be connected in common with a first output node OUT11. The fifth transistor TR15 may be connected between the first and second output nodes OUT11 and OUT12. For example, the fifth transistor TR15 may limit a voltage level of a signal that is output from the first output node OUT11.

The first output signal OTA1_OUT may be output from the first output node OUT11, and an inverted first output signal OTA1_OUT' may be output from the second output node OUT12. For example, in a period where a level of the ramp signal RAMP is higher than a level of the pixel signal PIX, the first output signal OTA1_OUT may have the high level; in a period where the level of the ramp signal RAMP is lower than the level of the pixel signal PIX, the first output signal OTA1_OUT may have the low level. The first output signal OTA1_OUT may be provided to the second amplifier 151_2 of FIG. 4.

The first current source 210 may include the sixth transistor TR16. The sixth transistor TR16 may be connected with a ground voltage VSS and may generate the first power current ISS1 based on a first bias signal BIAS1.

Meanwhile, during the auto-zero period, the switches SW1 and SW2 may be turned on in response to an auto-zero signal AZ. When the switches SW1 and SW2 are turned on, a second input node IN12 and the first output node OUT11 may be connected with each other, and a first input node IN11 and the second output node OUT12 may be connected with each other. Accordingly, during the auto-zero period, voltage levels of the first input node IN11, the second input node IN12, the first output node OUT11, and the second output node OUT12 may be equalized or substantially equalized.

Figure 6:
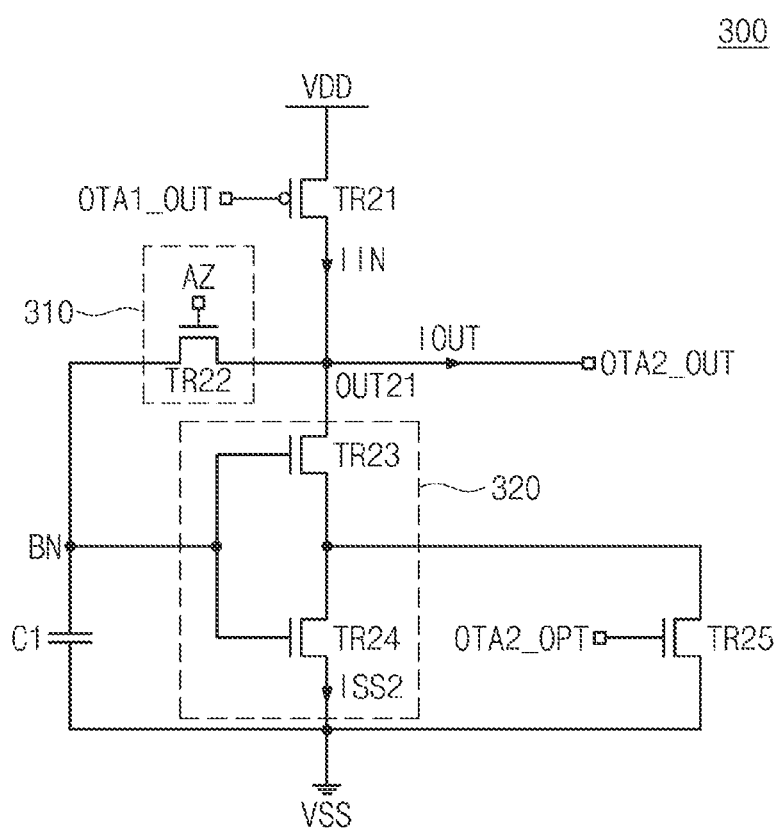
FIG. 6 is a circuit diagram illustrating an example of a second amplifier of FIG. 4.

FIG. 6 is a circuit diagram illustrating an example embodiment of the second amplifier 151_2 of FIG. 4. A second amplifier 300 may include a plurality of transistors TR21 to TR25, a capacitor C1, a switching circuit 310, and a current source 320. For example, the seventh transistor TR21 may be a PMOS transistor, and the eighth to eleventh transistors TR22 to TR25 may be NMOS transistors. However, the example embodiments are not limited thereto. The seventh to eleventh transistors TR21 to TR25 may be implemented with transistors whose types are different from those illustrated in FIG. 7.

The seventh transistor TR21 may receive the first output signal OTA1_OUT from the first amplifier 151_1 of FIG. 4 as an input, and may operate in response to the first output signal OTA1_OUT. For example, when a voltage level of the first output signal OTA1_OUT is the high level, the seventh transistor TR21 may be turned off. In this case, because a current does not flow to a third output node OUT21, a voltage level of the second output signal OTA2_OUT may be the low level. In contrast, when the voltage level of the first output signal OTA1_OUT is the low level, the seventh transistor TR21 may be turned on. In some example embodiments, because a current flows to the third output node OUT21, the voltage level of the second output signal OTA2_OUT may be the high level. In other words, the second amplifier 300 may operate as an inversion amplifier. That is, when the voltage level of the first output signal OTA1_OUT increases, the voltage level of the second output signal OTA2_OUT may decrease.

The switching circuit 310 may include the eighth transistor TR22 connected between the third output node OUT21 and a bias node BN. During the auto-zero period, the eighth transistor TR22 may operate in response to the auto-zero signal AZ, and may be turned on when the auto-zero signal AZ is activated. When the eighth transistor TR22 is turned on, the voltage level of the bias node BN and the voltage level of the third output node OUT21 may be equalized, and charges may be charged in the capacitor C1 connected with the bias node BN.

In contrast, in the case where the eighth transistor TR22 is turned off as the auto-zero signal AZ is deactivated during the comparison operation of the ADC circuit 150 of FIG. 4, the voltage level of the bias node BN, which is equal or substantially equal to the voltage level of the third output node OUT21, may be maintained by the capacitor C1, and thus, the current source 320 may operate.

The current source 320 may include the ninth transistor TR23 and the tenth transistor TR24 connected with each other. A drain terminal of the ninth transistor TR23 may be connected with the third output node OUT21, a source terminal of the ninth transistor TR23 and a drain terminal of the tenth transistor TR24 may be connected with the eleventh transistor TR25, and a source terminal of the tenth transistor TR24 may be connected with a ground voltage terminal VSS. The ninth transistor TR23 and the tenth transistor TR24 may generate a power current ISS2 based on the voltage of the bias node BN, that is, the voltage of one end of the capacitor C1.

The eleventh transistor TR25 may be turned on or turned off in response to the option signal OTA2_OPT. For example, the option signal OTA2_OPT may be a signal whose characteristic is identical or substantially identical to that of the auto-zero signal AZ. In other words, the option signal OTA2_OPT may be adjusted to have the high level during the auto-zero period and to have the low level during the comparison operation period.

Below, for clear description, the amount of charges capable of being charged in the capacitor C1 during the auto-zero period when the eleventh transistor TR25 is turned off (or when the second amplifier 300 does not include the eleventh transistor TR25) is referred to as a "first charge amount", and the voltage level of the bias node BN corresponding to the first charge amount is referred to as a "first level". The amount of charges capable of being charged in the capacitor C1 during the auto-zero period when the eleventh transistor TR25 is turned on is referred to as a "second charge amount", and the voltage level of the bias node BN corresponding to the second charge amount is referred to as a "second level".

When the eleventh transistor TR25 is turned on in response to the option signal OTA2_OPT of the high level, the effect that the ninth transistor TR23 operates and the tenth transistor TR24 does not operate may appear during the auto-zero period; in some example embodiments, charges may be charged in the capacitor C1 as much as the second charge amount smaller than the first charge amount. That is, the voltage level of the bias node BN may be adjusted from the first level to the second level lower than the first level. In other words, the eleventh transistor TR25 may adjust the voltage level of the bias node BN during the auto-zero period so as to be set to the second level lower than the first level.

When the auto-zero period ends (e.g., when the auto-zero signal AZ is disabled), the option signal OTA2_OPT may be disabled, and the eleventh transistor TR25 may be turned off. During the comparison operation period, as described above, the current source 320 may generate the power current ISS2 based on the voltage of the bias node BN. A level (hereinafter referred to as a "fourth level") of the power current ISS2 generated based on the voltage of the bias node BN having the second level may be smaller than a level (hereinafter referred to as a "third level") of the power current ISS2 generated based on the voltage of the bias node BN having the first level.

The level of an output current IOUT may be determined by subtracting the power current ISS2 from an input current IIN flowing through the seventh transistor TR21 (e.g., IOUT=IIN−ISS2). Accordingly, the level of the output current IOUT when the level of the power current ISS2 is the fourth level may be greater than the level of the output current IOUT when the level of the power current ISS2 is the third level. In other words, a relative level of the output current IOUT to the input current IIN having the same or substantially the same level may increase during the comparison operation period by adjusting the voltage of the bias node BN during the auto-zero period. As such, the operation of the second amplifier 300 may become faster, and a slew rate may increase.

Meanwhile, an example where the current source 320 includes two transistors TR23 and TR24 is illustrated in FIG. 6, but the example embodiments are not limited thereto. For example, the current source 320 may include three or more transistors. Also, the eleventh transistor TR25 may be connected with transistors included in the current source 320 to be different from the connection illustrated in FIG. 6.

Figure 7:
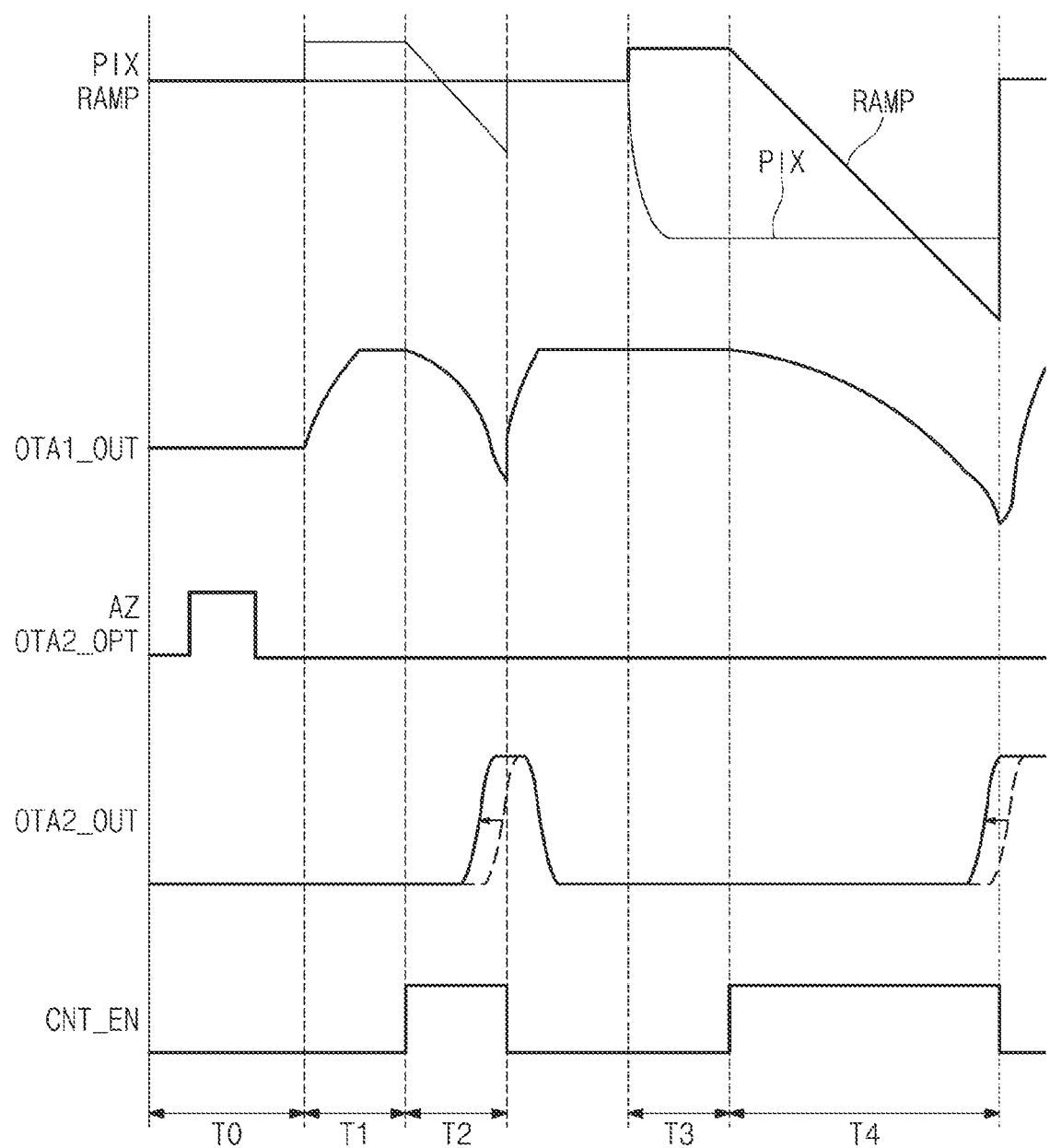
FIG. 7 is a timing diagram illustrating an operation of an analog-to-digital converting circuit of FIG. 4 as an example.

FIG. 7 is a timing diagram illustrating an operation of the analog-to-digital converting (ADC) circuit 150 of FIG. 4 as an example embodiment. Below, the description will be given with reference to FIGS. 6 and 7 together. A time period T0 may correspond to an auto-zero period, and a time period T1 and a time period T2 may correspond to a period in which the comparator 151 compares a reset signal of the pixel signal PIX and the ramp signal RAMP, and a time period T3 and a time period T4 may correspond to a period in which the comparator 151 compares an image signal of the pixel signal PIX and the ramp signal RAMP.

In the time period T0, the auto-zero signal AZ may be activated, and the comparator 151 may be initialized in response to the auto-zero signal AZ of the high level. Also, as described with reference to FIG. 6, in the time period T0, the option signal OTA2_OPT may be activated. As the eleventh transistor TR25 of the second amplifier 300 is turned on in response to the option signal OTA2_OPT of the high level, the voltage level of the bias node BN of the second amplifier 300 may decrease (e.g., to the second level lower than the first level) compared to the case where the eleventh transistor TR25 is turned off (or the case where the second amplifier 300 does not include the eleventh transistor TR25).

In the time period T1, to perform digital conversion on the reset signal of the pixel signal PIX, an offset may be applied to the ramp signal RAMP; the ramp signal RAMP may decrease in the time period T2. In the time period T2, as the decision of the ADC circuit 150 is made, the voltage level of the first output signal OTA1_OUT may decrease, and the voltage level of the second output signal OTA2_OUT may increase. In the time period T3, to perform digital conversion on the image signal of the pixel signal PIX, an offset may again be applied to the ramp signal RAMP; the ramp signal RAMP may decrease in the time period T4. Like the time period T2, in the time period T4, as the decision of the ADC circuit 150 is made, the voltage level of the first output signal OTA1_OUT may decrease, and the voltage level of the second output signal OTA2_OUT may increase.

As described with reference to FIG. 6, in the time period T0, as the voltage level of the bias node BN of the second amplifier 300 decreases, the level of the power current ISS2 may decrease in the time period T1 to the time period T4, and thus, the level of the output current IOUT may relatively increase. For example, the second output signal OTA2_OUT marked by a dotted line may correspond to the case where the level of the output current IOUT is the third level, and the second output signal OTA2_OUT marked by a solid line may correspond to the case where the level of the output current IOUT is the fourth level. As the level of the output current IOUT increases, the operation of the second amplifier 300 may become faster, which is illustrated by an arrow facing from the second output signal OTA2_OUT marked by the dotted line to the second output signal OTA2_OUT marked by the solid line in FIG. 7. Accordingly, it may be possible to perform the operation of the second amplifier 300 in the time period T2 and the time period T4. That is, the operation of the second amplifier 300 may be guaranteed while the counter enable signal CNT_EN is activated in the time period T2 and the time period T4.

Figure 8:
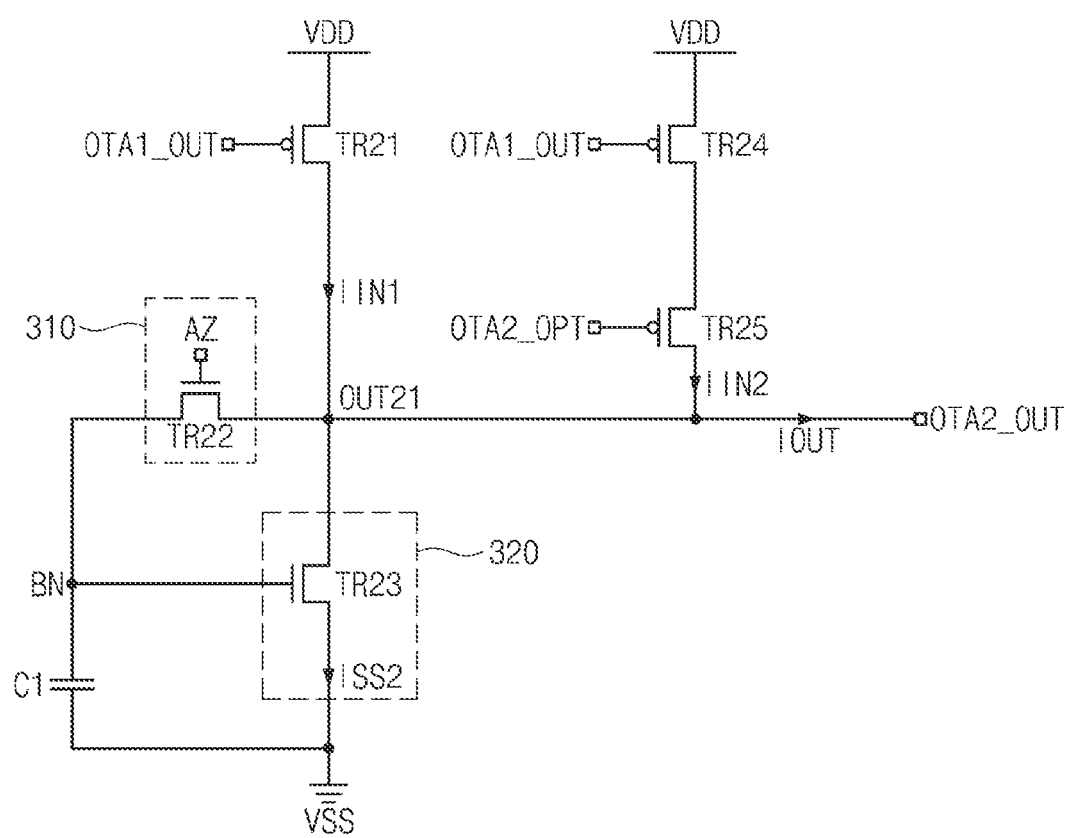
FIG. 8 is a circuit diagram illustrating another example of a second amplifier of FIG. 4.

FIG. 8 is a circuit diagram illustrating another example embodiment of the second amplifier 151_2 of FIG. 4. A second amplifier 300a may include a plurality of transistors TR21 to TR25, the capacitor C1, the switching circuit 310, and the current source 320. For example, the seventh transistor TR21, the tenth transistor TR24, and the eleventh transistor TR25 may be PMOS transistors, and the eighth transistor TR22 and the ninth transistor TR23 may be NMOS transistors. However, the example embodiments are not limited thereto. The seventh to eleventh transistors TR21 to TR25 may be implemented with transistors whose types are different from those illustrated in FIG. 8. A configuration and an operation of the second amplifier 300a are identical or substantially identical to the configuration and the operation of the second amplifier 300 of FIG. 6 except that the current source 320 includes only one transistor TR23 and except for operations of the tenth transistor TR24 and the eleventh transistor TR25, and thus, additional description will be omitted to avoid redundancy.

The eleventh transistor TR25 may be turned on or turned off in response to the option signal OTA2_OPT, and the option signal OTA2_OPT may be a signal whose characteristic is identical or substantially identical to that of the auto-zero signal AZ (e.g., that has the high level during the auto-zero period and has the low level during the comparison operation period). During the auto-zero period, the eleventh transistor TR25 may be turned off in response to the option signal OTA2_OPT of the high level. However, unlike the second amplifier 300 of FIG. 6, the amount of charges charged in the capacitor C1 and the voltage of the bias node BN during the auto-zero period may not be adjusted.

Instead, as the option signal OTA2_OPT is set to the low level during the comparison operation period, the eleventh transistor TR25 may be turned on, and a second input current IIN2 may further flow to the third output node OUT21 through the tenth transistor TR24 operating in response to the first output signal OTA1_OUT. In other words, as the eleventh transistor TR25 is turned on, in addition to the first input current IIN1 flowing through the seventh transistor TR21, the second input current IIN2 may further flow to the third output node OUT21 through the tenth transistor TR24, and thus, the level of the output current IOUT may increase (e.g., in the condition that IOUT=IIN−ISS2, because ISS2 does not change but INN increases to (IIN1+IIN2), IOUT increases). As such, the operation of the second amplifier 300 may become faster, and a slew rate may increase.

Figure 9:
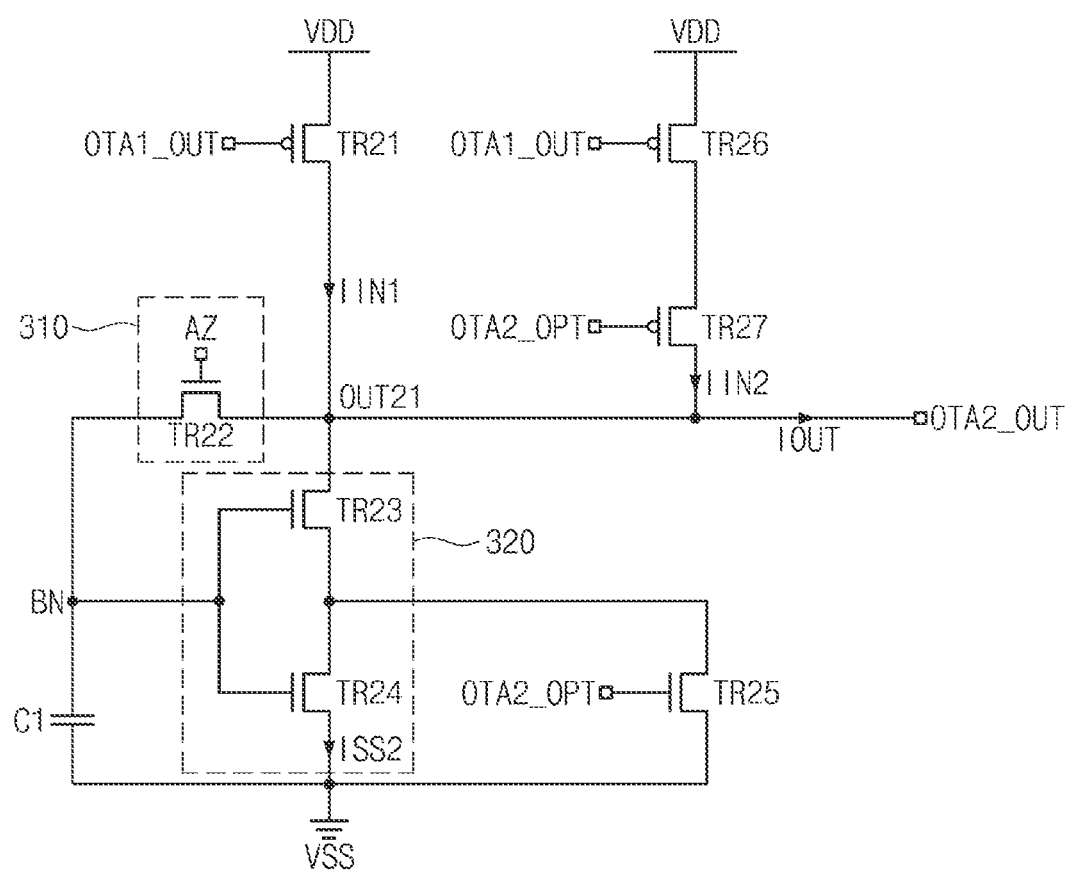
FIG. 9 is a circuit diagram illustrating another example of a second amplifier of FIG. 4.

FIG. 9 is a circuit diagram illustrating another example embodiment of the second amplifier 151_2 of FIG. 4. A second amplifier 300b may include a plurality of transistors TR21 to TR27, the capacitor C1, the switching circuit 310, and the current source 320. For example, the seventh transistor TR21, the twelfth transistor TR26, and the thirteenth transistor TR27 may be PMOS transistors, and the eighth to eleventh transistors TR22 to TR25 may be NMOS transistors. However, the example embodiments are not limited thereto. The seventh to thirteenth transistors TR21 to TR27 may be implemented with transistors whose types are different from those illustrated in FIG. 9. Like FIG. 8, the description that is identical to the description given with reference to FIG. 6 will be omitted to avoid redundancy.

Operations of the current source 320 and the eleventh transistor TR25 are identical or substantially identical to those of the second amplifier 300 of FIG. 6, and operations of the twelfth transistor TR26 and the thirteenth transistor TR27 are identical to those of the second amplifier 300a of FIG. 8. That is, in the case of the second amplifier 300b, like FIG. 6, as the eleventh transistor TR25 is turned on in response to the option signal OTA2_OPT of the high level during the auto-zero period, the voltage of the bias node BN may be adjusted to decrease, and thus, the level of the power current ISS2 may decrease during the comparison operation period. Like FIG. 8, as the thirteenth transistor TR27 is turned on in response to the option signal OTA2_OPT of the low level during the comparison operation period, the second input current IIN2 may further flow to the third output node OUT21.

According to the above description, as the level of the power current ISS2 decreases depending on the operation of the eleventh transistor TR25 and the second input current IIN2 further flows to the third output node OUT21 depending on the operation of the thirteenth transistor TR27, the level of the output current IOUT may increase (e.g., in the condition that IOUT=IIN−ISS2, because ISS2 decreases and INN increases to (IIN1+IIN2), IOUT increases). As such, the operation of the second amplifier 300b may become faster, and a slew rate may increase.

Meanwhile, an example where the current source 320 includes two transistors TR23 and TR24 is illustrated in FIG. 9, but the example embodiments are not limited thereto. For example, the current source 320 may include three or more transistors. Also, the eleventh transistor TR25 may be connected with transistors included in the current source 320 to be different from the connection illustrated in FIG. 9.

Figure 10:
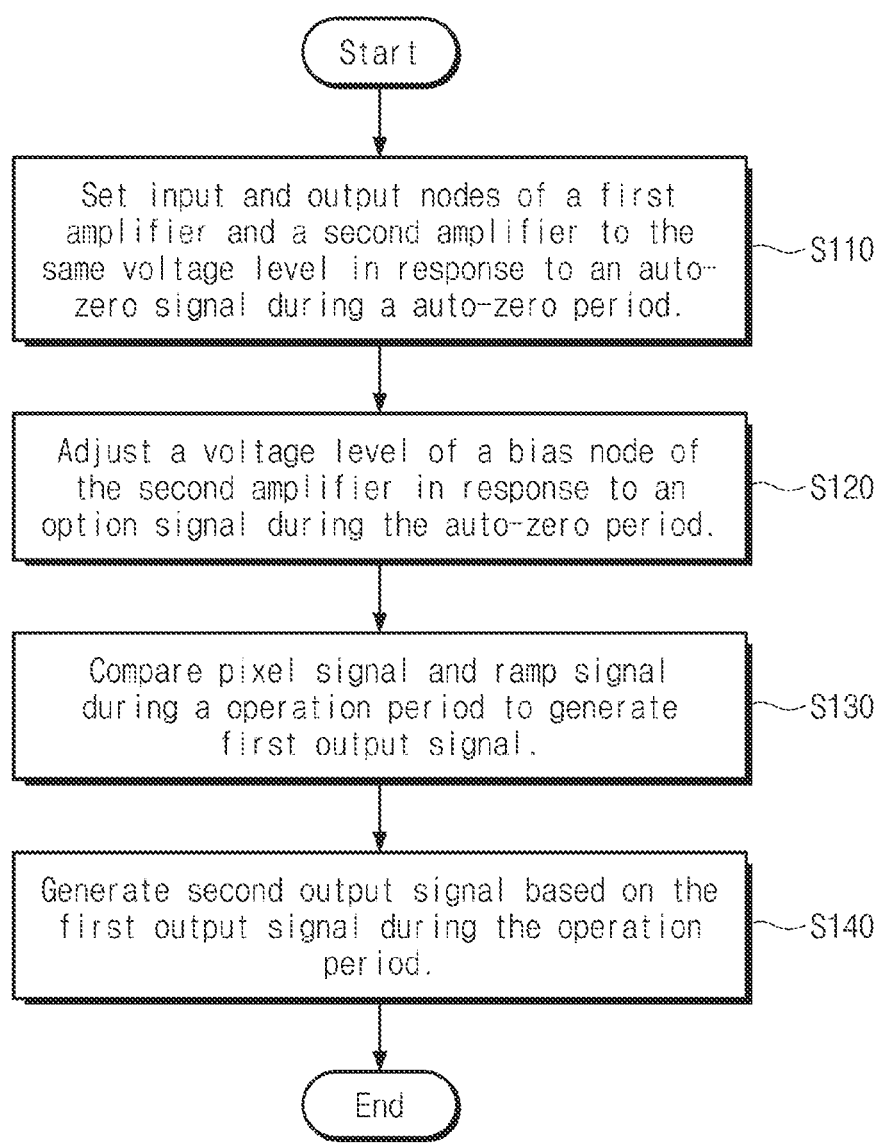
FIG. 10 is a flowchart illustrating an operation method of an analog-to-digital converting circuit for decreasing decision delay, according to an example embodiment of the present disclosure.

FIG. 10 is a flowchart illustrating an operation method of an analog-to-digital converting (ADC) circuit for decreasing decision delay, according to an example embodiment of the present disclosure. Below, FIG. 10 will be described with reference to FIGS. 4 to 6 together.

In operation S110, the first amplifier 200 and the second amplifier 300 may equalize or substantially equalize voltage levels of the input nodes and the output nodes in response to an auto-zero signal during the auto-zero period. In operation S120, the second amplifier 300 may adjust the voltage level of the bias node BN in response to the option signal OTA2_OPT, during the auto-zero period. For example, to adjust the voltage level of the bias node BN, the second amplifier 300 may include a transistor (e.g., TR25 of FIG. 6) that operates in response to the option signal OTA2_OPT.

In operation S130, the first amplifier 200 may compare the pixel signal PIX output from the pixel array 110 with the ramp signal RAMP in the comparison operation period and may generate the first output signal OTA1_OUT. In detail, the first amplifier 200 may compare the reset signal of the pixel signal PIX and the ramp signal RAMP, may compare the image signal of the pixel signal PIX and the ramp signal RAMP, and may generate the first output signal OTA1_OUT on comparison results. In operation S140, the second amplifier 300 may generate the second output signal OTA2_OUT based on the first output signal OTA1_OUT, during the comparison operation period. Also, the level of the output current IOUT corresponding to the second output signal OTA2_OUT may be increased based on the voltage level of the bias node BN adjusted in operation S120.

In addition, as described with reference to FIG. 8, the operation method of the ADC circuit according to an example embodiment of the present disclosure may further include increasing the level of the output current IOUT by increasing a level of an input current of a second amplifier (e.g., 300a of FIG. 8) in response to the option signal OTA2_OPT during the comparison operation period (e.g., by allowing the second input current IIN2 to further flow in addition to the first input current IIN1, as described with reference to FIG. 8, in response to the option signal OTA2_OPT during the comparison operation period).

According to an example embodiment of the inventive concepts, decision delay of an analog-to-digital converting circuit may decrease by adjusting a voltage level of a bias node of a comparator. Also, according to an example embodiment of the inventive concepts, as the decision delay of the analog-to-digital converting circuit decreases, a slew rate may increase.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While some inventive concepts have been described with reference to example embodiments thereof, it will be apparent to those of ordinary skill in the art that various changes and modifications may be made thereto without departing from the scope of the inventive concepts.

What is claimed is:

1. An analog-to-digital converting circuit comprising:
   a first amplifier configured to output a first output signal by comparing a pixel signal output from a pixel array with a ramp signal; and
   a second amplifier configured to generate a second output signal based on the first output signal, wherein the second amplifier includes
   a first transistor configured to provide a power supply voltage to a first output node in response to the first output signal, the second output signal output from the first output node,
   a second transistor connected with a capacitor through a bias node, wherein the second transistor is configured to turn on in response to an auto-zero signal,
   a current source connected with the first transistor through the first output node, the current source connected with the capacitor and the second transistor through the bias node, and the current source configured to generate a power current based on a voltage level of the bias node, which is maintained by the capacitor, and
   a third transistor connected with the current source, wherein the third transistor is configured to turn on in response to an option signal during an auto-zero period corresponding to a high level of the auto-zero signal.

2. The analog-to-digital converting circuit of claim 1, wherein, when the third transistor is turned on in response to the option signal, the voltage level of the bias node is configured to decrease such that a level of an output current corresponding to the second output signal increases.

3. The analog-to-digital converting circuit of claim 2, wherein the current source includes:
   a fourth transistor connected with the first transistor; and
   a fifth transistor connected with the fourth transistor and a ground voltage terminal, and wherein the third transistor is connected with a node between the fourth transistor and the fifth transistor and the ground voltage terminal.

4. The analog-to-digital converting circuit of claim 3, wherein
the auto-zero signal and the option signal are configured to activate before comparing the pixel signal and the ramp signal, and the auto-zero signal and the option signal are configured to deactivate during comparing the pixel signal and the ramp signal, and
a first voltage level of the bias node when the third transistor is turned on while the auto-zero signal is activated is lower than a second voltage level of the bias node when the third transistor is turned off while the auto-zero signal is activated.

5. The analog-to-digital converting circuit of claim 4, wherein
a first level of the power current generated based on the first voltage level of the bias node is lower than a second level of the power current generated based on the second voltage level of the bias node, and
a level of the output current based on the first level of the power current is higher than a level of the output current based on the second level of the power current.

6. The analog-to-digital converting circuit of claim 3, wherein
the first transistor is a PMOS transistor, and
the second to fifth transistors are NMOS transistors.

7. The analog-to-digital converting circuit of claim 1, wherein the second amplifier further includes:
a fourth transistor connected with the third transistor, the fourth transistor configured to provide the power supply voltage to the first output node in response to the first output signal.

8. The analog-to-digital converting circuit of claim 7, wherein
a first input current is configured to flow to the first output node through the first transistor,
when the third transistor is turned on in response to the option signal, a second input current is configured to flow to the first output node through the fourth transistor such that a level of an output current corresponding to the second output signal increases, and
the auto-zero signal and the option signal are configured to activate before comparing the pixel signal and the ramp signal, and the auto-zero signal and the option signal are configured to deactivate during comparing the pixel signal and the ramp signal.

9. The analog-to-digital converting circuit of claim 7, wherein
the first transistor, the third transistor, and the fourth transistor are PMOS transistors, and
the second transistor is an NMOS transistor.

10. The analog-to-digital converting circuit of claim 1, wherein the second amplifier further includes:
a fourth transistor connected with the third transistor, the fourth transistor configured to provide the power supply voltage to the first output node in response to the first output signal; and
a fifth transistor connected with the current source.

11. A circuit configured to generate an output signal, the circuit comprising:
a first transistor configured to provide a power supply voltage to a first output node, the first output node configured to output an output signal;
a second transistor connected with a capacitor through a bias node, wherein the second transistor is configured to turn on in response to an auto-zero signal;
a current source connected with the first transistor through the first output node, the current source connected with the capacitor and the second transistor through the bias node, and the current source configured to generate a power current based on a voltage level of the bias node, which is maintained by the capacitor; and
a third transistor connected with the current source, wherein the third transistor is configured to turn on in response to an option signal during an auto-zero period corresponding to a high level of the auto-zero signal.

12. The circuit of claim 11, wherein, when the third transistor is turned on in response to the option signal, the voltage level of the bias node is configured to decrease such that a level of an output current corresponding to the output signal increases.

13. The circuit of claim 12, wherein the current source includes:
a fourth transistor connected with the first transistor; and
a fifth transistor connected with the fourth transistor and a ground voltage terminal, and
wherein the third transistor is connected with a node between the fourth transistor and the fifth transistor and the ground voltage terminal.

14. The circuit of claim 13, wherein
the auto-zero signal and the option signal are configured to activate before comparing a pixel signal and a ramp signal, and the auto-zero signal and the option signal are configured to deactivate during comparing the pixel signal and the ramp signal, and
a first voltage level of the bias node when the third transistor is turned on while the auto-zero signal is activated is lower than a second voltage level of the bias node when the third transistor is turned off while the auto-zero signal is activated.

15. The circuit of claim 14, wherein
a first level of the power current generated based on the first voltage level of the bias node is lower than a second level of the power current generated based on the second voltage level of the bias node, and
a level of the output current based on the first level of the power current is higher than a level of the output current based on the second level of the power current.

16. The circuit of claim 13, wherein
the first transistor is a PMOS transistor, and
the second to fifth transistors are NMOS transistors.

17. The circuit of claim 11, further comprising:
a fourth transistor connected with the third transistor, the fourth transistor configured to provide the power supply voltage to the first output node.

18. An operation method of an analog-to-digital converting circuit that includes a first amplifier and a second amplifier, the method comprising:
equalizing voltage levels of input nodes and output nodes of the first and second amplifiers in response to an auto-zero signal in an auto-zero period;
adjusting a voltage level of a bias node of the second amplifier in response to an option signal in the auto-zero period;
comparing, at the first amplifier, a pixel signal output from a pixel array with a ramp signal, to generate a first output signal in an operation period;
generating, at the second amplifier, a second output signal based on the first output signal in the operation period; and increasing, at the second amplifier, a level of an output corresponding to the second output signal by increasing a level of an input current in response to the option signal, wherein the input current is based on the first output signal.

19. The method of claim 18, wherein the generating of the second output signal includes:
increasing a level of an output current corresponding to the second output signal based on the adjusted voltage level of the bias node of the second amplifier.

* * * * *